J. FRAME.
SHIP SCALE.
APPLICATION FILED FEB. 27, 1914.
1,135,104.
Patented Apr. 13, 1915.
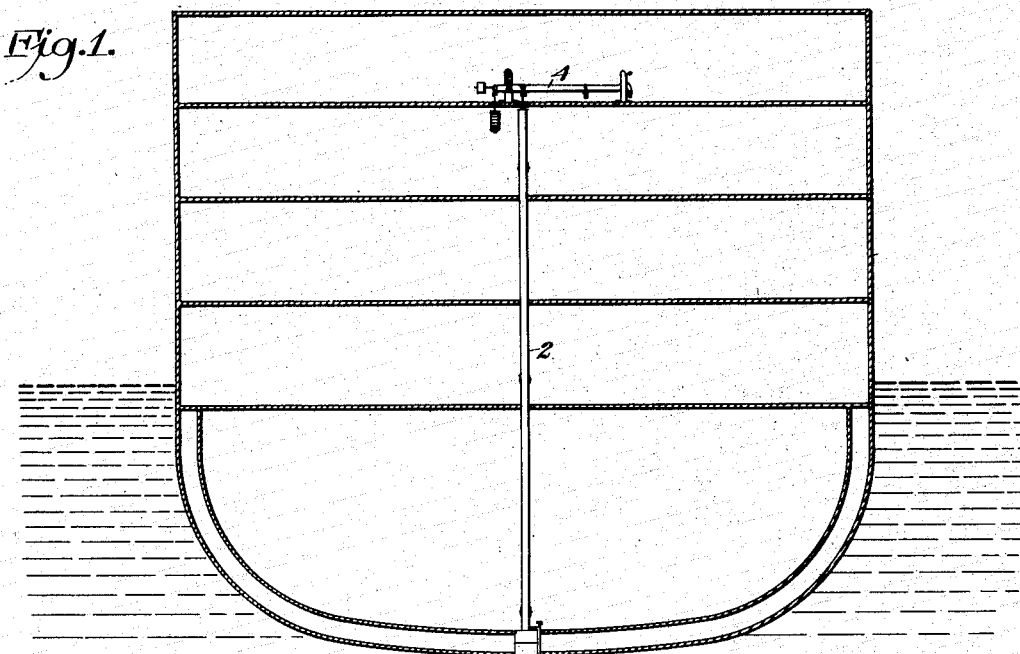
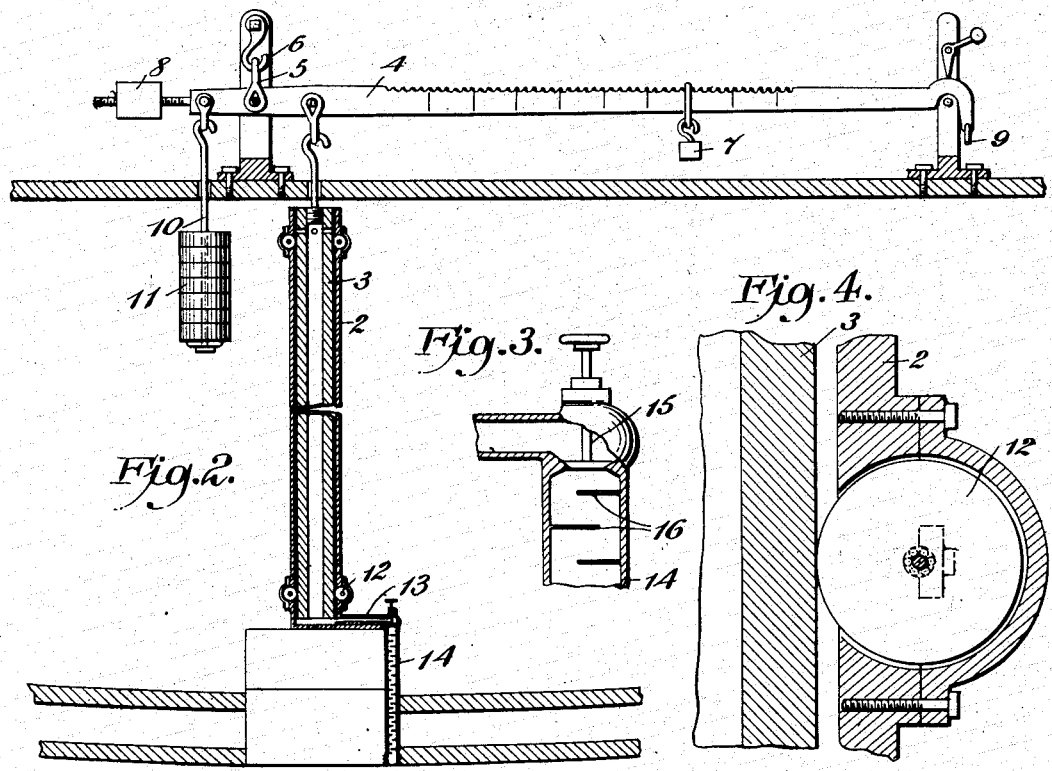
WITNESSES
INVENTOR
John Frame
BY
ATTORNEYS

UNITED STATES PATENT OFFICE.

JOHN FRAME, OF SEARSPORT, MAINE.

SHIP-SCALE.

1,135,104.

Specification of Letters Patent.

Patented Apr. 13, 1915.

Application filed February 27, 1914. Serial No. 821,486.

*To all whom it may concern:*

Be it known that I, JOHN FRAME, a citizen of the United States, and a resident of Searsport, in the county of Waldo and State of Maine, have invented a new and Improved Ship-Scales, of which the following is a full, clear, and exact description.

This invention relates to improvements in scales, and particularly to scales for weighing ships and the cargo of ships, and has for an object to provide an improved structure wherein the ship may be weighed at any time when empty, and the cargo may be weighed as the same is taken on board.

Another object of the invention is to provide a scale device on a ship which utilizes the difference between the specific gravity of water and metal or other suitable substance for disclosing the weight of the ship, and also the weight of the ship plus the contents thereof.

In carrying out the object of the invention the device may be connected to any kind of ship, and is provided at its upper part with the usual scale beam, weights, etc., but instead of having counterbalancing weights acted on by the load a metallic member is connected with the beam which is designed to be submerged in water let in from the bottom of the ship, whereby the specific difference of gravity between the water and the iron member will cause the scale beam to be actuated.

In the accompanying drawings—Figure 1 is a section through the hull of a ship showing an embodiment of the invention connected therewith; Fig. 2 is a longitudinal vertical section through the invention shown in Fig. 1, the same being shown on an enlarged scale; Fig. 3 is an enlarged fragmentary sectional view of a valve and inlet pipe; Fig. 4 is an enlarged sectional view of one of the guiding rollers embodying certain features of the invention.

Referring to the accompanying drawings by numeral, 1 indicates the hull of a ship which may be of any desired kind. Connected with the ship is a tube 2 which extends from the bottom of the ship to near the top, said tube containing a tubular member 3, preferably of metal, which is pivotally connected with a beam 4 in the usual way in which a scale beam is connected to the draft bar, namely, by a link and hook, the link being preferably mounted on knife edged trunnions. The beam 4 is supported by link 5 interlocking with hook 6 and carries a sliding weight 7 for indicating the weight of the ship and the additional weight placed on the ship when the ship is loaded. The beam 4 carries at its rear end an adjusting weight 8 in the usual manner for providing a proper counterbalance to weight 7 and the beam 4. If desired, at the front end of the beam 4 a weight may be connected with link 9 in the usual manner. At the rear of beam 4 a rod or bar 10 is connected therewith which carries a plurality of weights 11 which tend to raise beam 4 and consequently counteract the weight of member 3. Member 3 is arranged in tube 2 and is preferably formed hollow though this is not absolutely necessary. A plurality of bearing rollers 12 are arranged in tube 2 and bear against the sleeve or tube 3 so as to guide the same in its reciprocatory movement. Connected with the bottom of tube 2 is a by-pass 13 merging into an inlet pipe 14. A valve 15 is interposed at the intersection of by-pass 13 and inlet 14 so as to control the passage of water from one member to the other. The inlet 14 is provided with a plurality of staggered baffling members 16 so that water flowing through the inlet members 14 must be a steady flow or movement as slight variations in the water level will not cause any action of the water in the inlet member 14. From Fig. 2 it will be observed that the inlet member 14 is open to the water at the bottom of the ship, and when the scale is in operation valve 15 is opened, whereby the water may freely enter into pipe 2 and rise to the proper level. As the water rises to the proper level in pipe 2 the same counteracts or overcomes some of the weight of pipe 3 and thereby allows weight 11 to move beam 4 pivotally. The specific gravity of water and the metal pipe 3 is such that this action will take place to a greater or less extent, according to the amount of water in pipe 2. For instance, the action of pipe 3 on beam 4 will cause a certain movement of beam 4 when the ship is empty, and when the ship is being loaded and water continues to rise in tube 2 the action of member 3 on beam 4 will be continued so as to show the additional weight put on the ship. It is to be understood that member 3 is of iron or some other suitable material which has an appreciable weight, and which does not float in the water but has a specific gravity different from the water, whereby the difference in the specific gravity of the member 3 and the water causes a movement of beam 4. This movement may be counteracted by shifting the weight 7, whereby the amount of action in pounds may be indicated by properly graduating the scale beam 4. It is evident that if the beam 4 is balanced with the weight 7, as shown in Fig. 2 when the ship is empty, any load placed upon the ship will cause the beam 4 to be raised against the action of weight 7. Weight 7 can then be moved until the beam 4 is counterbalanced, and the amount of movement will indicate the amount of weight placed upon the ship.

In mounting the device in a ship the same is preferably arranged centrally of the ship and rests upon the keel or any suitable member near the bottom of the ship. It is also evident that the tube or pipe 2 must extend to a point above the highest water line of the ship, otherwise the water can pass from pipe 2 into the ship. It is also evident that the pipe or tube 3 which acts as a measuring weight may be of any desired length so that the amount of difference in the specific gravity of the same and the water may be an appreciable amount in order to allow a proper graduation of the scale 4 without making the graduations too small.

What I claim is—

In a scale of the class described, the combination with a ship, of a tube arranged in said ship extending from the bottom thereof to near the top, an inlet member in free communication with the exterior of said ship and also with said tube, said inlet member being provided with staggered baffles for preventing temporary fluctuations of the height of water in said tube, a valve for controlling the flow of water through said inlet member, an iron weight arranged in said tube, a pivotally mounted beam connected with said iron weight, and a counterbalancing weight connected with said beam, said counterbalancing weight acting against said first mentioned weight.

In testimony whereof I have signed my name to this specification in the presence of two subscribing witnesses.

JOHN FRAME.

Witnesses:
JOHN N. SULLIVAN,
FRED M. PERKINS.